United States Patent

Toyoda et al.

[11] Patent Number: 5,713,123
[45] Date of Patent: Feb. 3, 1998

[54] METHOD OF LAPPING FOR PRODUCING ONE-SIDE CURVED SURFACE ADAPTED FOR FLOATING MAGNETIC HEAD

[75] Inventors: Atsushi Toyoda; Keiichi Shinoda; Toshitaka Yoshino, all of Hamamatsu, Japan

[73] Assignee: Yamaha Corporation, Japan

[21] Appl. No.: 456,194

[22] Filed: May 31, 1995

[30] Foreign Application Priority Data

Jun. 3, 1994 [JP] Japan .................................. 6-145550

[51] Int. Cl.⁶ .................................................. G11B 5/127
[52] U.S. Cl. .................... 29/603.12; 29/603.17; 451/5
[58] Field of Search .................. 29/603.12, 603.16, 29/603.17; 451/5, 11, 41, 59, 287, 1, 37; 360/103, 104

[56] References Cited

U.S. PATENT DOCUMENTS

| | | | |
|---|---|---|---|
| 3,685,216 | 8/1972 | Frey et al. | 451/56 |
| 4,333,229 | 6/1982 | Ellenberger | 29/603.12 |
| 4,420,780 | 12/1983 | Deckert | 360/103 |
| 5,136,445 | 8/1992 | Zak | 360/103 |
| 5,266,769 | 11/1993 | Deshpande et al. | 219/121.69 |
| 5,365,700 | 11/1994 | Sawada et al. | 451/41 X |
| 5,442,850 | 8/1995 | Kerth | 29/603.12 |

FOREIGN PATENT DOCUMENTS

| | | |
|---|---|---|
| 0558202 | 9/1993 | European Pat. Off. |
| 5-20826 | 1/1993 | Japan |

OTHER PUBLICATIONS

H.J. Lee, et al., "*Study of Head and Disk Interface in Contact Start Stop Test*", IEEE Transactions on Magnetics, vol. 25, No. 5, Sep. 1989, p. 3722.

Edakawa et al., Japan 05-20826, "Magnetic Head and Manufacturing of Same" (Abstract) Jan. 29, 1993.

Primary Examiner—Peter Vo
Assistant Examiner—Khan Nguyen
Attorney, Agent, or Firm—Ostrolenk, Faber, Gerb & Soffen, LLP

[57] ABSTRACT

After both an ABS and a back surface of a slider are lapped, a one-surface lapping resulting in balanced compressive stresses of the ABS is performed resulting in unbalanced stresses to make the ABS flat while warping the ABS. At this stage, the slider deforms by changing the back surface in a convex shape, and the ABS itself is maintained flat by the lapping. Thereafter, a one-surface lapping of the back surface is performed to reduce the compressive stresses therein and make the back surface flat while warping the back surface. The slider deforms by changing the ABS in a convex shape and a positive crown on the ABS is formed. The ABS can be lapped flat, and in addition the crown can be formed. Reliability of data read/write can be improved.

31 Claims, 11 Drawing Sheets

5,713,123

METHOD OF LAPPING FOR PRODUCING ONE-SIDE CURVED SURFACE ADAPTED FOR FLOATING MAGNETIC HEAD

BACKGROUND OF THE INVENTION a) Field of the Invention

The present invention relates to a method of manufacturing a floating type magnetic head used for a magnetic disc drive, and more particularly to a method of manufacturing a magnetic head having a convex or a so-called crown formed on an air bearing surface (ABS), i.e., a surface facing a recording medium.

b) Description of the Related Art

A floating type magnetic head is generally formed on a support member called a slider. An air flow is introduced between one surface of the slider and a magnetic disk to float the slider. The slider therefore forms an air bearing. The slider surface facing a magnetic disk is called an air bearing surface (ABS).

A conventional floating type magnetic head has generally a flat ABS. While a recording medium is at a standstill, the flat ABS contacts a relatively broad area of the surface of the recording medium. A large starting torque is therefore required for a motor to start, and the surface of the recording medium may be damaged.

To deal with these problems, as shown in FIG. 1, it has been proposed to form a crown on an ABS 12 of a magnetic head 10. Specifically, a curvature is formed on the ABS 12 along a direction of relative motion with a recording medium so that this convex ABS gives a small contact area with the recording medium during its landing period.

Japanese Patent Laid-open Publication No.5-20826 proposes a method of forming a crown on an ABS by utilizing a residual stress of a slider. According to this method, both the ABS and the back surface of the slider are simultaneously lapped first to balance residual stresses of both the surfaces. Next, either the back surface is lapped to increase compressive stress or the ABS is lapped to reduce compressive stress.

Residual stress changes with a roughness of an abraded surface. Generally, the more the manufacturing process causes the surface to roughen the larger the residual stress, and the more the manufacturing process causes the surface to smoothen (the more the surface takes a mirror surface), the smaller the residual stress.

The requisite condition for this method described in Japanese Patent Laid-open Publication No.5-20826 is:

roughness of the ABS>roughness of the back surface.

Therefore, even if roughness Ra of the back surface is made as small as, for example, Ra=5 angstroms, roughness Ra of the ABS becomes as large as about Ra=20 to 100 angstroms. Therefore, the ABS of a magnetic head manufactured by this method facing the recording medium becomes more rough than the back surface. However, it is desired to make the recording medium-facing ABS as smooth as possible.

SUMMARY OF THE INVENTION

It is an object of the present invention to provide a method of manufacturing a magnetic head capable of forming a crown on an ABS and improving smoothness of the ABS.

It is another object of the present invention to provide a method of manufacturing a magnetic head having high reliability.

According to one aspect of the present invention, there is provided a method of manufacturing a structure having a curved surface, comprising the steps of: (a) preparing a platelet having a pair of main surfaces; (b) simultaneously lapping the pair of first and second surfaces of said platelet to a first surface roughness to provide flat platelet; (c) lapping the first surface of the lapped pair of surfaces to a second surface roughness finer than said first surface roughness under a condition that said platelet is deformable; and (d) lapping the second surface of the lapped pair of surfaces to a third surface roughness under the condition that said platelet is deformable, after said lapping step (c) to provide a positive crown on the first surface and flat surface on the second surface.

A platelet can be deformed by positively utilizing forces in layers accumulating residual stress generated by abrasion. By performing one-surface lapping twice, a convex surface excellent in smoothness can be formed.

According to another aspect of the present invention, there is provided a method of manufacturing a magnetic head comprising the steps of: (a) simultaneously lapping both an air bearing surface (ABS) and a back surface at opposite sides of a slider;(b) performing one-surface lapping on said ABS while allowing warpage of the ABS, deforming the slider and flattening a lapping surface of said ABS, after said both-surface lapping step (a); and (c) performing one-surface lapping of said back surface while allowing deformation of said slider to make said back surface flat, after said one-surface lapping step (b), wherein a positive crown shape of said ABS is formed by said steps (a) to (c).

After the ABS and back surface of a slider, inclusive of a state in a row, are both lapped, one-surface lapping of the ABS is performed while shrinking the ABS (in order to improve smoothness). At this stage, the slider deforms by changing the ABS in a concavity shape and by changing the back surface in a convex shape, and the ABS itself is maintained flat because the concavity is removed by being lapped. Thereafter, one-surface lapping of the back surface is performed while shrinking the back surface, the slider deforms by changing the ABS in a convex shape, and a positive crown is formed on the ABS. In this manner, the ABS can be made smooth (e.g., Ra=5 angstroms or smaller), and in addition the positive crown can be formed. Reliability of data read/write can be improved.

According to a further aspect of the present invention, there is provided a method of manufacturing a magnetic head comprising the steps of:(a) forming a crown on an air bearing surface (ABS) of a row having a plurality of sliders each having said ABS and a back surface at opposite sides of said slider, said crown forming step (a) including both-surface lapping said ABS and said back surface, one-surface lapping said ABS flat while warping said ABS, and one-surface lapping said back surface while warping said back surface, in this order recited; (b) separating said row into the plurality of sliders after said step (a); and (c) forming a rail pattern in said ABS of each slider, at any timing between said both-surface lapping and said one-surface lapping of ABS, between said one-surface lapping of said ABS and said one-surface lapping of said back surface, or between said one-surface lapping of said back surface and said row separating step (b).

Positive crowns are formed from a row before it is divided into sliders, the productivity is therefore improved.

According to still another aspect of the present invention, there is provided a method of manufacturing a magnetic head comprising the steps of: (a) performing both-surface lapping of an ABS and a back surface at opposite sides of a row having a plurality of sliders; (b) forming a rail pattern in said ABS of each slider and separating said row into the plurality of sliders, after the step (a); and (c) forming a crown on said ABS after said step (b), said step (c) including one-surface lapping said ABS to make said ABS flat while shrinking said ABS and then one-surface lapping said back surface to make said back surface flat while shrinking said back surface.

After the both-surface lapping and rail pattern forming steps, a row is divided into sliders and each crown is formed.

The one-surface lapping of the ABS may function also as a throat height lapping. In this case, it is not necessary to perform a separate throat height lapping, and processes are simplified. A crown shape is also prevented from deformation by a separate throat height lapping.

A crown on the ABS can be formed while maintaining the residual stresses in the ABS and back surface generally at the same level.

DETAILED DESCRIPTION OF THE PREFERRED EMBODIMENTS

In the present invention, an air bearing surface (ABS) means a surface of a slider opposing to a rotating magnetic medium. A back surface means a surface which disposed at an opposite side of the slider with respect to the magnetic slider. Moreover, a positive crown means a topography of the ABS having a convex surface. A negative crown means a topography of the ABS having a concave surface.

Stress can be generated in an abraded surface. The material and grain size of abrasive, an abrading method, and other factors can be properly selected to realize a desirable stress in the abraded surface.

Figure 1:
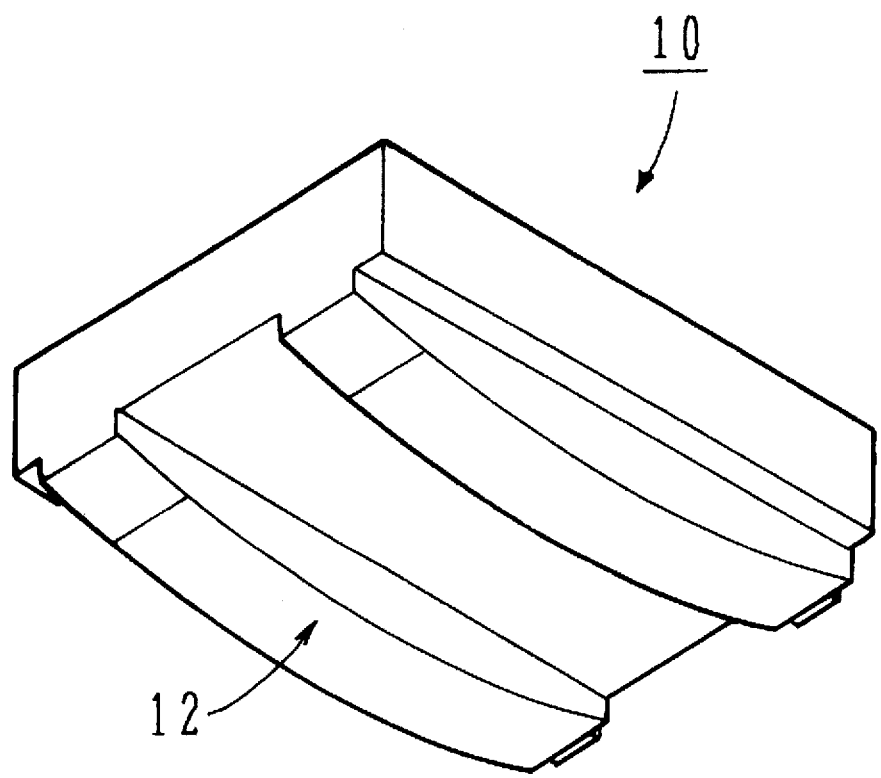
FIG. 1 is a perspective view of a magnetic head having a crown-shaped ABS.
Figure 2A:
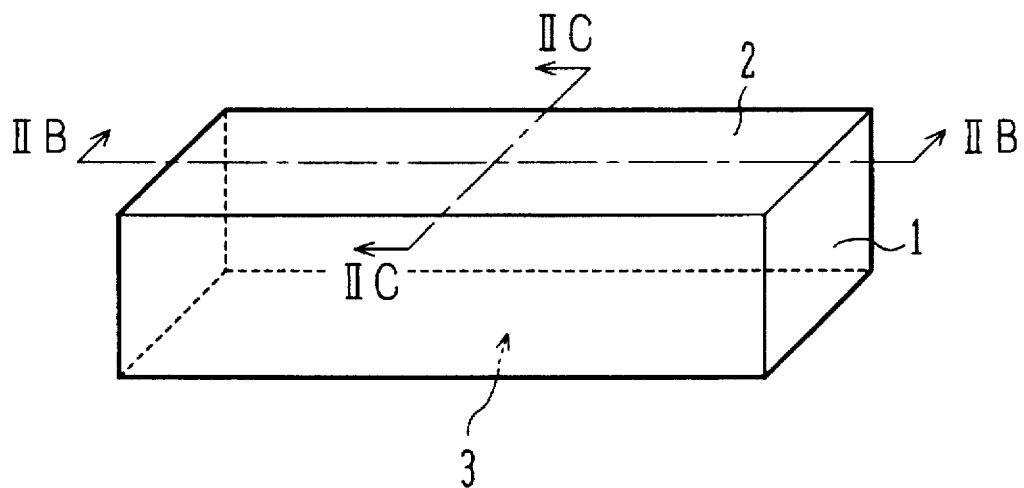
FIGS. 2A to 2C are a perspective view and cross sectional views illustrating how a strip of workpiece is processed.
Figure 2B:
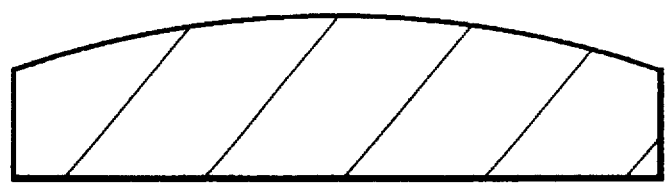
Figure 2C:
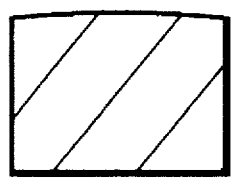

As shown in FIG. 2A, a row type strip of workpiece 1 is easily curved along the direction of the longer side, and is not easily curved along the direction of the shorter side. Therefore, as the upper and lower surfaces are abraded and lapped, curvature of the upper surface 2 changes largely along the longer side as shown in FIG. 2B, and changes less along the shorter side as shown in FIG. 2C. However, the curvature in the row type strip of workpiece 1 along the longer side does not raise an issue when the workpiece 1 is severed into plural pieces of sliders.

In order to finish a strip of workpiece to have a curved surface largely changing along the shorter side, the deformation along the longer side may be suppressed by some force.

The most simplest method is to use a workpiece having a side sufficiently longer than the shorter side, to mount the workpiece on a jig via a member permitting some deformation such as a resilient member and an adhesive layer having some thickness, and to work one surface of the workpiece. If deformation is permitted within some range, the radius of curvature of the longer side becomes larger than that of the shorter side.

Figure 3A:
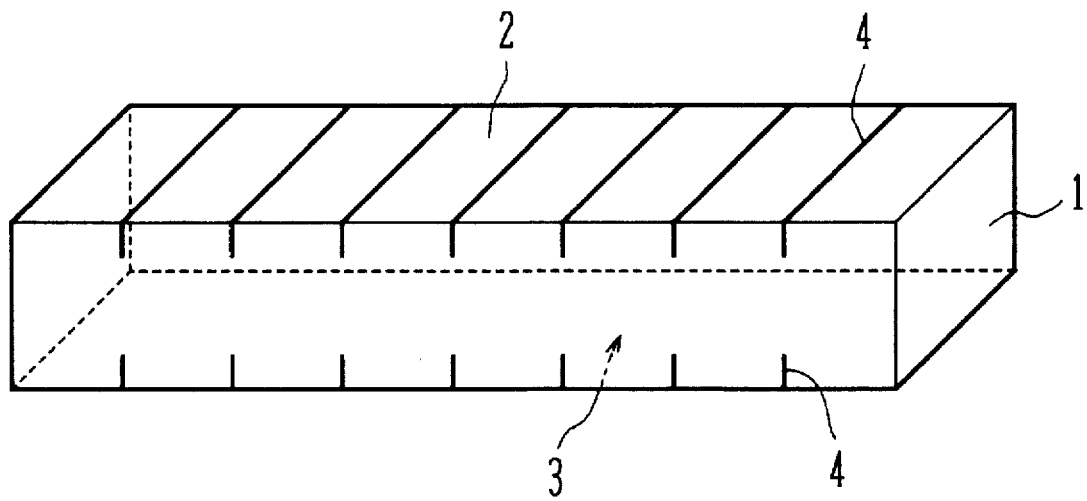
FIGS. 3A and 3B are perspective views illustrating a method of finishing a strip of workpiece to have a curved surface changing more along a short side direction thereof.
Figure 3B:
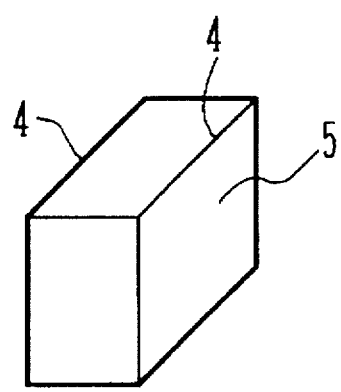

FIGS. 3A and 3B illustrate another method of finishing a strip of workpiece to have a curved surface largely changing along the shorter side.

The workpiece shown in FIG. 3A is long in the horizontal direction and short in the vertical direction. Scribe lines 4 are formed in the upper and lower surfaces 2 and 3 of the workpiece 1 along the direction of the shorter side, the upper and lower scribe lines 4 being aligned together in upper and lower positions. If the workpiece 1 is diced along the scribe lines 4, rectangular prisms are obtained having a longer side along the scribe line 4 as shown in FIG. 3B. Each scribe line 4 is preferably deeper than a layer which accumulates relatively strong compressive stress generated during abrasion. More preferably, a depth of a virtual rectangular prism shown in FIG. 3B is set so that the prism is more easily deformed along the direction of the scribe line 4 than the horizontal direction.

If the workpiece shown in FIG. 3A is processed, the surface stress is relieved at the scribe lines 4. As a result, the surface stress is imparted separately to each virtual unit 5 shown in FIG. 3B partitioned by the scribe lines 4. A stronger force is therefore applied along the direction of the scribe line 4, and the workpiece 1 is easily deformed along the direction of the shorter side. A finished surface largely changing along the direction of the shorter side can therefore be obtained.

Scribe lines may be formed in only one surface in place of forming them in both the upper and lower surfaces. For example, scribe lines 4 are formed in only the lower surface which is to be the back surface, and the workpiece is processed. After both the surfaces are abraded, the stress accumulating layer under the upper surface is removed by lapping the upper surface to form a smooth surface. At this time, the workpiece is deformed in a downward-convex shape by the stress accumulated in a layer under the lower surface. Since the lower surface is divided by the scribe lines, a synthetic or accumulated force along the direction of the scribe line is stronger so that a curved surface largely deforming along the direction of the scribe line can be obtained. Thereafter, the lower surface is lapped. The deformation upon release of the stress recovers the original shape of the workpiece so that the upper surface, which is to be the ABS, becomes a curved surface of a downward-convex shape along the direction of the scribe line.

In the above description, abrasion and lapping are used which are theoretically the same process. Both the processes are called hereinafter lapping. Any process may be used so long as it forms a relatively rough surface having relatively large accumulated stress in its stress accumulating layer and a relatively smooth surface having relatively small accumulated stress in its stress accumulating layer.

Embodiments of forming a slider of a magnetic head having an air bearing surface with a positive crown will be described hereinunder. General knowledge of a magnetic head manufacturing method is disclosed, for example, in U.S. patent application Ser. No. 8/297,222, filed on Aug. 29, 1994, now U.S. Pat. No. 5,425,819 and U.S. Ser. No. 08/409,733, filed on Mar. 23, 1995, and U.S. Ser. No. 08/413,515, filed on Mar. 30, 1995, which are incorporated herein by reference.

One embodiment of a method of forming crowns from a row will be described with reference to FIGS. 4A to 4J.

Figure 4A:
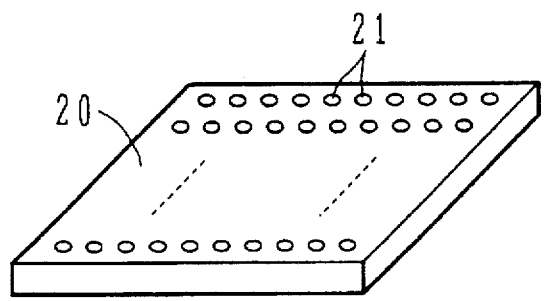
FIGS. 4A to 4J are perspective views and cross sectional views illustrating thin film magnetic head manufacturing processes for forming crowns on a row, according to another embodiment of the invention.

(1) Wafer process (refer to FIG. 4A)

A number of thin film magnetic transducers 21 are formed in rows and columns on a wafer 20 made of ceramic such as altic ($Al_2O_3$—TiC). For example, two transducers per one head assembly are formed.

Figure 4B:
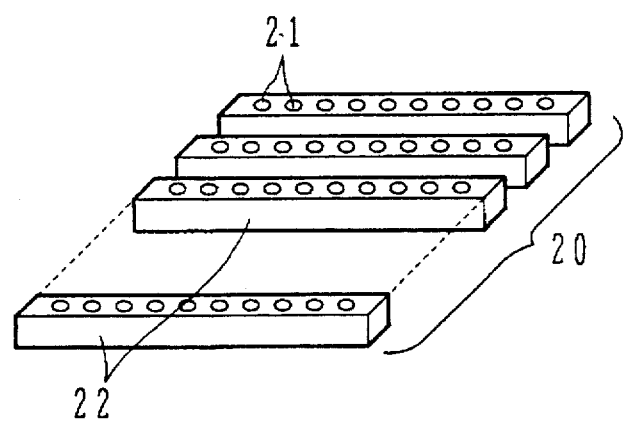

(2) Row slicing (refer to FIG. 4B)

The wafer is sliced into a plurality of strip of rows 22. Each row 22 has a plurality of magnetic transducers 21 disposed in line. In FIG. 4B, one side of each row 22 will be processed to have an air bearing surface, and the opposing side will be called a back surface.

Figure 4C:
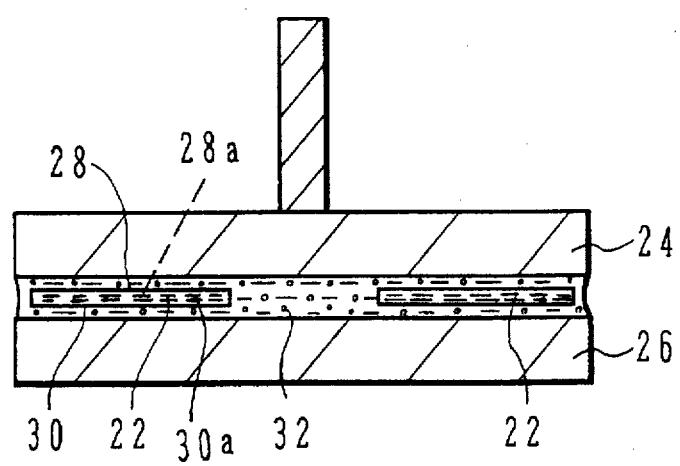

(3) Both-surface lapping (refer to FIG. 4C)

Rows 22 are placed between upper and lower level blocks 24 and 26 of a lapping machine, directing ABSs 28 upward and back surfaces 30 downward. Lapping fluid containing suspended lapping grains 32 (lapping slurry) is injected between the level blocks 24 and 26 for simultaneously lapping both ABSs 28 and back surfaces 30. As the level blocks 24 and 26 take a relative rotation, the lapping liquid enters gaps between the rows and the level blocks 24 and 26 and laps the rows 22. In order to form desired crowns, the both-surface lapping condition such as the types of the level blocks 24 and 26 and the lapping grains 32 is properly selected. In other words, roughness degrees (residual stress values) of both the surfaces 28 and 30 by the both-surface lapping is properly set. For example, if the roughness degree of both the surfaces 28 and 30 is to be set to Ra=20 angstroms, GC1000 may be used as the lapping grains 32, and ductile cast iron level blocks may be used as the level blocks 24 and 26.

With this both-surface lapping, a row having a high degree of parallelization and a small warpage (e.g., warpage of 2 μm or smaller) can be obtained, and compressive stresses larger than the inner stress are residual in very thin surface layers (e.g., 3 μm) 28a and 30a, respectively of the ABS 28 and back surface 30. The row 22 has a high linearity because of balanced stresses in both the surfaces 28 and 30 which are the characteristics of the both-surface lapping.

Figure 4D:
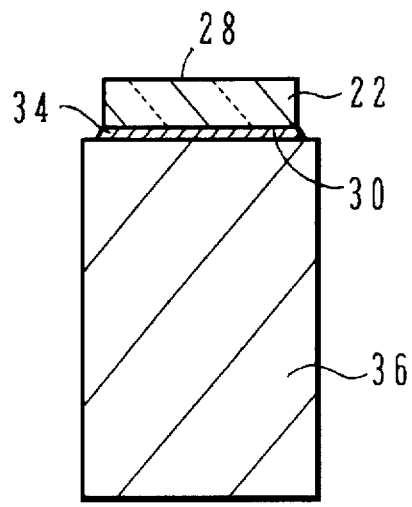

(4) Row adhesion (refer to FIG. 4D)

After the both-surface lapping, the back surface of the row 22 is adhered to a jig (work holder) by adhesive 34 for the one-surface lapping (throat height work) of the ABS 28. A proper type of the adhesive 34 is selected in order to obtain a deformability and adhesive strength necessary for forming a crown of a floating type magnetic head. For example, relatively soft resin or colophonium based wax may be used. A plurality of work holders 36 each having a row adhered thereto may be formed for performing lapping in batch.

Figure 4E:
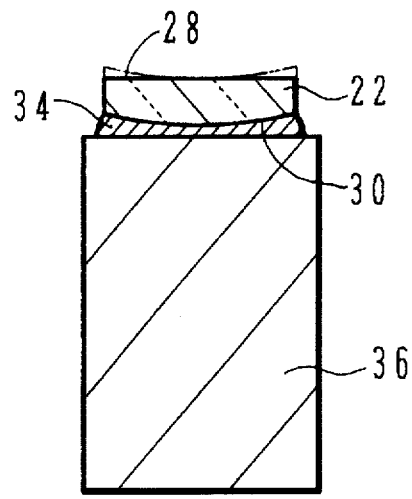

(5) Throat height lapping (one-surface lapping of ABS) (refer to FIG. 4E)

The ABS 28 is lapped to define the throat height (a length of a pole of the thin film magnetic transducer 21 to have a target value. For example, diamonds having a diameter of 0.5 μm are used as the lapping grains, and the roughness degree Ra of the lapped ABS 28 is made as flat as about 8 angstroms. As the roughness degree becomes small while the ABS 28 is lapped with fine lapping grains, the residual compressive stress in the residual stress layer of lapped ABS 28 reduces. Therefore, residual compressive stresses in the residual stress layers of ABS 28 and back surface 30 are unbalanced. During lapping, the ABS 28 virtually warps upward whereas the back surface 30 virtually warps downward correspondingly, the row 22 warps downward convex (upward concave), and the ABS 28 virtually takes a concave shape as indicated by a two-dot chain line. Since colophonium based wax is soft, the row 22 is permitted to deform some degree. However, deformation to the degree that the row 22 is peeled off from the work holder 36 is not permitted due to its adherence. Therefore, deformation along the direction of the longer side of the row 22 is limited to a relatively small quantity, and deformation as shown in FIG. 4E is formed along the direction of the shorter side of the row 22. The concave deformation of the ABS 28 is, however, simultaneously removed by the throat height lapping with the warpage and the ABS 28 is made flat as indicated by a solid line.

Deformation of a row during lapping of the ABS will be detailed with reference to FIGS. 5A to 5C.

Figure 5A:
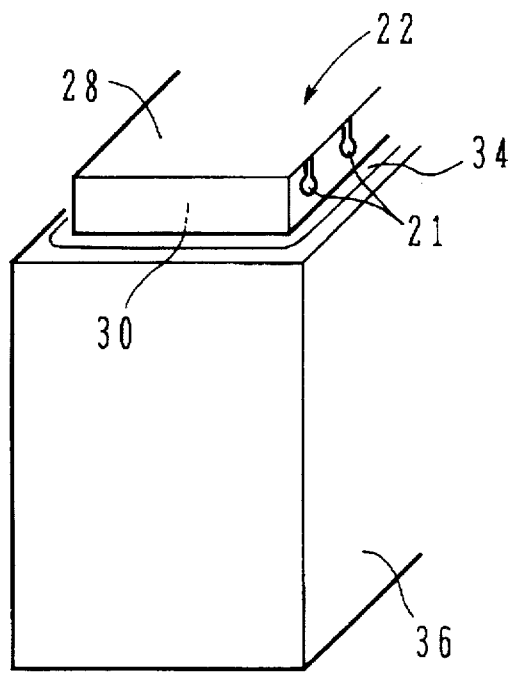
FIGS. 5A to 5C are perspective views illustrating throat height working process described with FIG. 4F.

FIG. 5A shows a row 22 adhered to the work holder 36. The row 22 has thin film magnetic transducers 21 (inductive type, magnetoresistive type, etc.) formed on the side wall thereof. Each transducer includes a magnetic circuit having a magnetic gap at the upper portion thereof as viewed in FIG. 5A. A length (throat height) of a pole portion of this magnetic circuit (electromagnet) is made to have a predetermined value. The adhesive 34 like colophonium based wax is soft and deformable to some degree. The row 22 has a long and slender rectangle shape. Therefore, even if the adhesive 34 is deformed and the row 22 is deformed, a radius of curvature of deformation permitted in the longer side direction is large. If the shorter side of the row 22 deforms by the same amount, its radius of curvature is greatly smaller than that of the longer side.

Figure 5B:
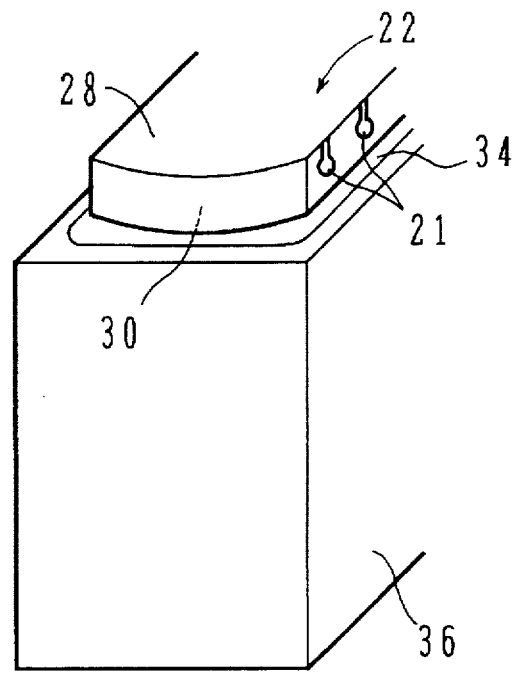

FIG. 5B virtually shows the deformed row 22 after the ABS 28 is lapped. The compressive stress in the residual stress layer of the ABS 28 reduces and that in residual stress layer of the back surface 30 becomes stronger than the former. As a result, the back surface expands whereas the ABS 28 shrinks, and the row 22 tends to deform in a downward-convex shape. The row 22 is curved in the shorter side direction. If the residual stress layer in the ABS 28 is removed, the deformation of the row 22 is permitted sufficiently. Here, it is generally necessary to lap the ABS thicker than the residual stress layer by the throat height lapping. Therefore, the row deformation can be generated at the same time of throat height lapping.

Figure 5C:
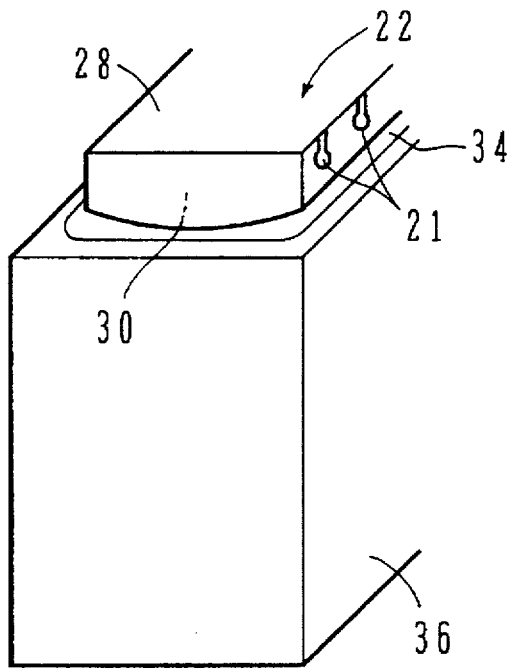

Actually, as shown in FIG. 5C, the ABS 28 is simultaneously lapped with the above deformation, so that the ABS 28 of the deformed row 22 has a flat surface by throat height lapping. This flat ABS 28 has such a shape as obtained by cutting flat a concave surface of a platelet deformed in a downward-convex shape such as shown in FIG. 5B. The convex surface of the back surface 30 is formed by the compressive stress in the residual stress layer of the back surface.

Figure 4F:
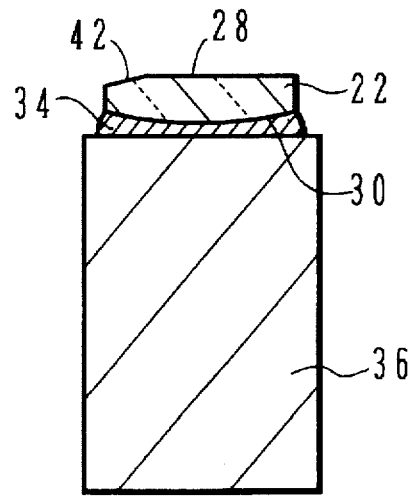

(6) Taper work (refer to FIG. 4F)

While the row 22 is maintained mounted on the work holder 36, the ABS 28 on the air inlet side is cut obliquely to form a taper surface 42.

Figure 4G:
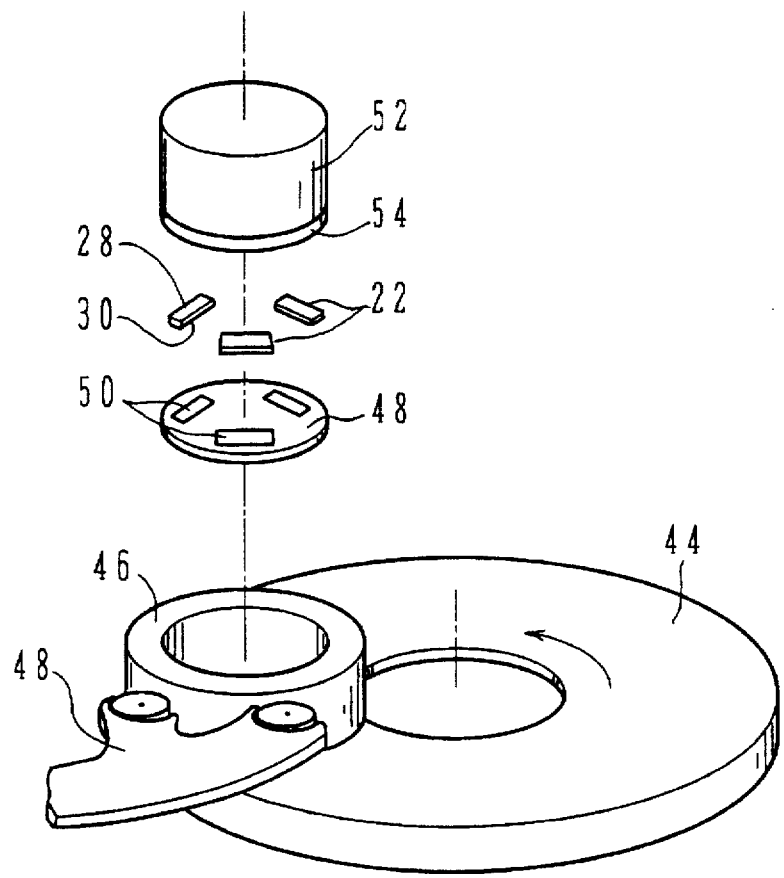

(7) Back surface lapping (one-surface lapping of back surface) (refer to FIG. 4G)

After the throat height lapping and taper work, the row 22 is dismounted from the work holder 36 for the one-surface lapping of the back surface 30. The one-surface lapping of the back surface 30 is performed for the row 22 dismounted from the work holder 36 and not adhered thereto. Specifically as shown in FIG. 4G, a guide ring 46 is placed on a lapping level block 44, the side wall of the guide ring 46 being pushed by guide rollers 48. A carrier 48 having a thickness of about 0.3 mm is housed in the guide ring 46. Rows 22 are fitted in holding holes 50 formed in the carrier 48, with the back surfaces being directed downward. Relative positions of rows 22 are determined by the carrier 48. A weight 52 is placed on the rows 22. A rubber pad 54 is attached to the bottom of the weight 52 in order to have a fitted contact with the rows 22. The lapping level block 44 is rotated under the above conditions. As shown by the cross sectional view of FIG. 4H, the back surface of each row 22 is lapped.

The types of lapping grains and the level block are properly selected to generate desired residual stress. For example, diamonds having a diameter of 0.5 μm are used as the lapping grains, and the roughness degree Ra of the lapped back surface 30 is made as flat as about 8 angstroms. As the roughness degree becomes small while the back surface 30 is lapped with fine lapping grains, the residual compressive stress in the residual stress layer of the lapped back surface 30 reduces. In this embodiment, the surface roughness of the ABS and the surface roughness of the back surface approximate to each other. However, the surface roughness of the ABS may be smoother than the surface roughness of the back surface.

Figure 6A:
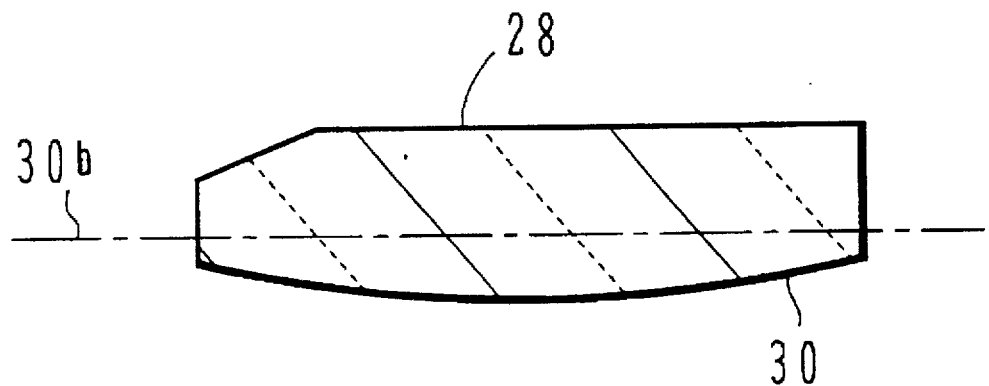
FIGS. 6A and 6B are cross sectional views illustrating back surface lapping process described with FIGS. 4 G and 4H.

As shown in FIG. 6A, as the back surface 30 is lapped to have a flat surface of a level 30b, the residual compressive stress in its residual stress layer reduces. Therefore, the back surface 30 side shrinks whereas the row 22 warps in the direction opposite to the previously described warpage of the row 22.

Figure 6B:
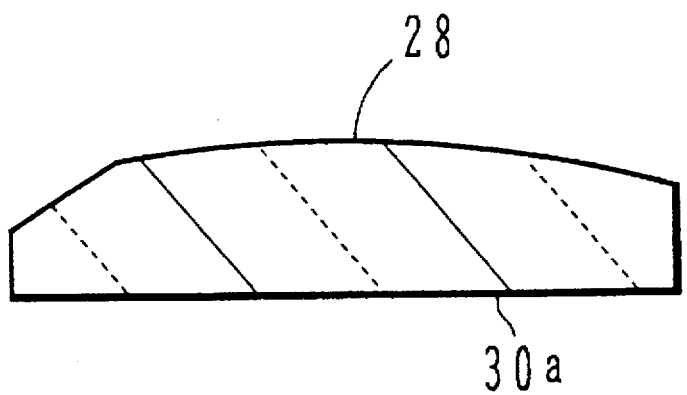

As shown in FIG. 6B, this warpage makes the ABS 28 have a convex (i.e., positive crown) shape. In this case, the concave shape of the back surface 30 formed by the warpage of the row 22 is lapped to make the back surface 30 flat. After this lapping, the residual stresses in the ABS 28 and back surface 30 residual layer are generally balanced. Here, the term "generally" means from the practical point of view. Minor or local unbalance, which does not cause non-negligible deformation, is allowed. This also means that the surface roughnesses of the ABS and the back surface are also equal from the practical point of view.

Figure 4H:
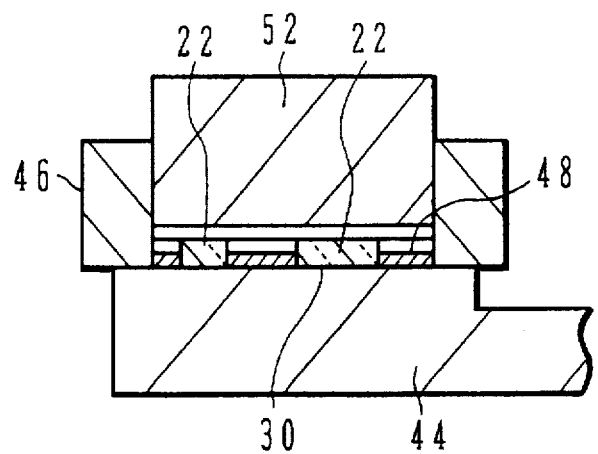

The back surface lapping is not limited only to the processes illustrated in FIGS. 4G and 4H, but it may be performed by adhering the ABS to the jig similar to the processing of the ABS illustrated in FIGS. 4D to 4F.

Figure 4I:
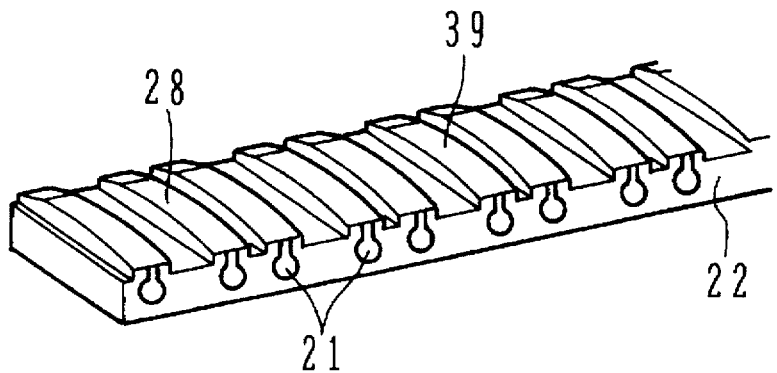

(8) Patterning ABS rail (refer to FIG. 4I)

A rail pattern 39 is formed by cutting trenches in the ABS 28 of the row 22 formed with the crown.

Figure 4J:
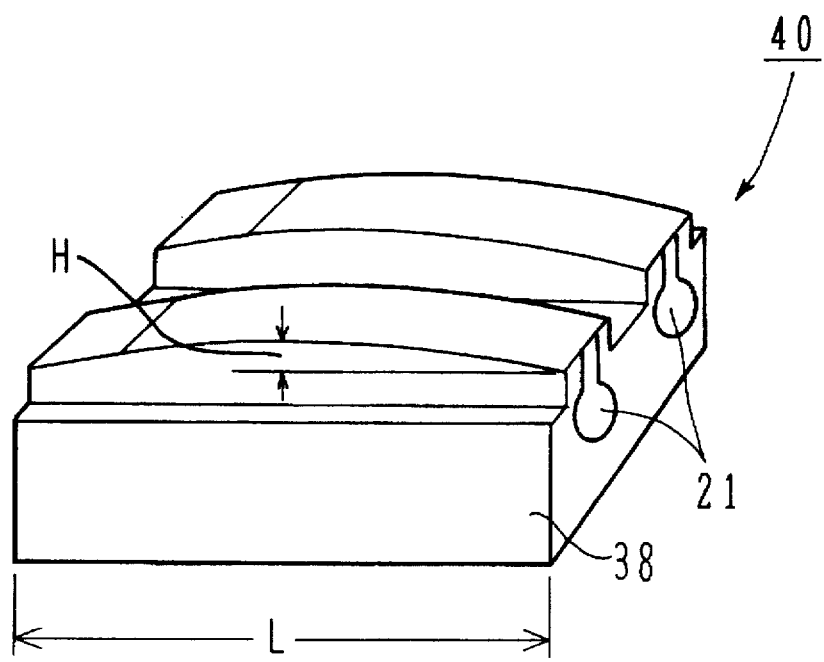

(9) Cutting (refer to FIG. 4J)

The row 22 is cut into sliders 38. Each slider 38 constitutes a magnetic head 40. The height of the crown 38 of a finished slider 38 is about 30 nm with a slider length L of 2 mm.

In the above processes, controlling the size of a crown is most influenced by the both-surface lapping conditions giving initial residual stresses, the conditions being determined when the types of grains and the material of a level block are determined. The next factors influencing the control of crown size are the type (adhesive strength) of adhesive such as wax used for adhering a row to lap ABS, the size of diamonds used for the mirror surface lapping (one-surface lapping), and the type of level block.

With the above processes, a desired crown shape can be formed while ensuring that the ABS 28 has a roughness degree Ra of 5 angstroms or lower like a mirror surface. It is therefore possible to form a crown while ensuring a high reliability of read/write operation. Since each crown is formed from a row, productivity is excellent.

Another embodiment of the invention in which a crown is formed after a row is divided into sliders, will be described with reference to FIGS. 7A and 7B.

The processes including (1) a wafer process, (2) row slicing, (3) both-surface lapping, and (4) row adhesion, are performed in the same manner described with the processes illustrated in FIGS. 4A to 4D.

Figure 7A:
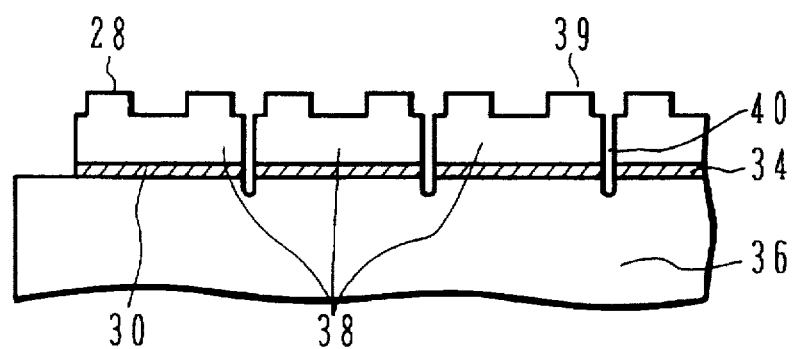
FIGS. 7A and 7B are a cross sectional and a perspective views illustrating thin film magnetic head manufacturing processes for forming a crown after a row is sliced into sliders, according to still another embodiment of the invention.

(5) ABS rail patterning and slider separation (refer to FIG. 7A)

A rail pattern 39 is formed by cutting trenches in the ABS 28. While the row 22 is adhered to the work holder 36, separation grooves 40 are formed to separate the row 22 into sliders 38.

(6) Throat height lapping (one-surface lapping of ABS)

By a similar method of the throat height lapping illustrated in FIG. 4E, the ABS 28 is subjected to the throat height lapping by the one-surface lapping. The residual stresses in the residual layers of the ABS 28 and back surface 30 become unbalanced. Since a workpiece is a small slider, unbalanced residual compressive stresses deform the slider in its longitudinal direction. In this case, it is not necessary to suppress deformation by adhesive. Therefore, a variety type of adhesives can be used. During lapping, the ABS 28 shrinks, the slider 38 warps, and the ABS 28 deforms in a concave shape. However, this concave deformation of the ABS 28 is removed by this throat height lapping itself and the ABS 28 is made flat.

(7) Taper work

By a similar method of the taper work illustrated in FIG. 4F, the ABS 28 on the air inlet side is cut obliquely to form a taper surface.

Figure 7B:
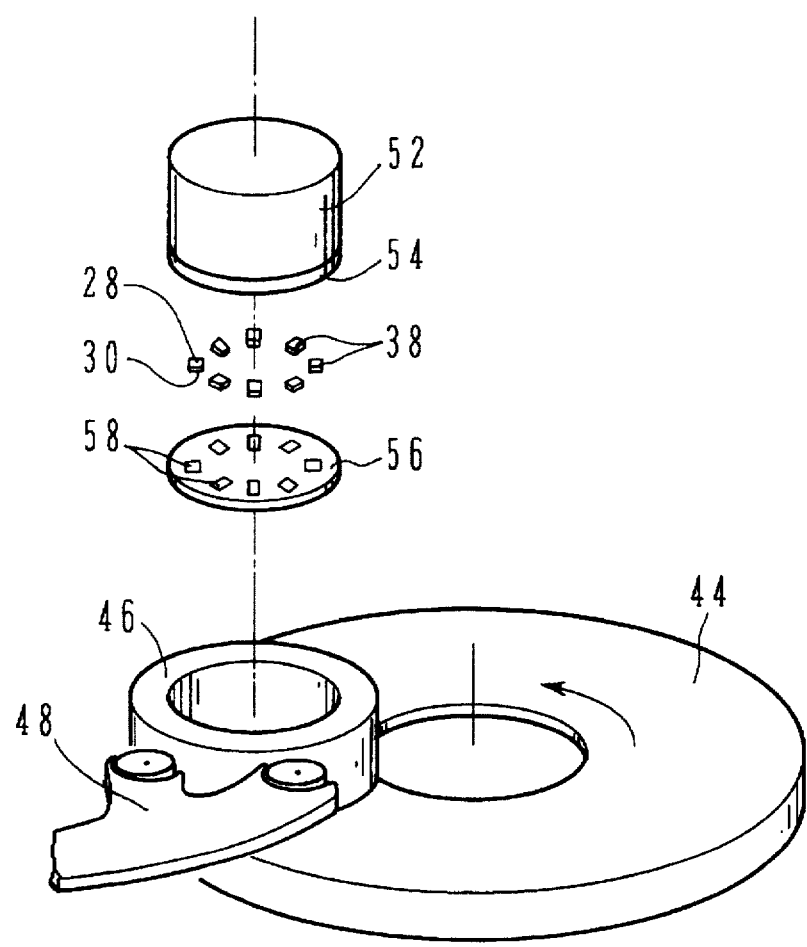

(8) Back surface lapping (one-surface lapping of back surface) (refer to FIG. 7B)

After the throat height lapping and taper work, each of the sliders 38 is dismounted from the work holder 36 for the one-surface lapping of the back surface 30. The one-surface lapping of the back surface 30 is performed for the slider 38 without adhering it to the work holder 36. Specifically, a guide ring 46 is placed on a lapping level block 44, the side wall of the guide ring 46 being pushed by guide rollers 48. A carrier 56 having a thickness of about 0.3 mm is housed in the guide ring 46. Sliders 38 are fitted in holding holes 58 formed in the carrier 56, with the back surfaces being directed downward. A weight 52 is placed on the sliders 38. A rubber pad 54 is attached to the bottom of the weight 52 in order to have a fitted contact with the sliders 38. The lapping level block 44 is rotated under the above conditions, and the back surface of each slider 38 is lapped.

Figure 8A:
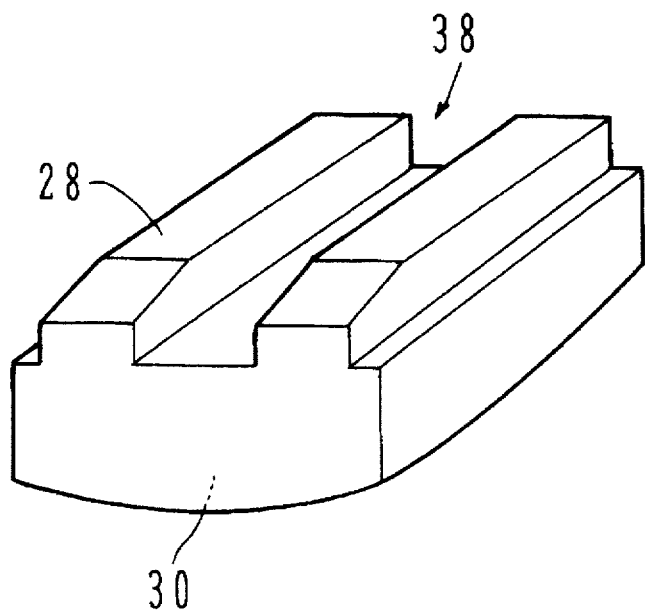
FIGS. 8A and 8B are perspective views illustrating back surface working process described with FIG. 7B.

FIG. 8A shows a slider before the back surface lapping.

Figure 8B:
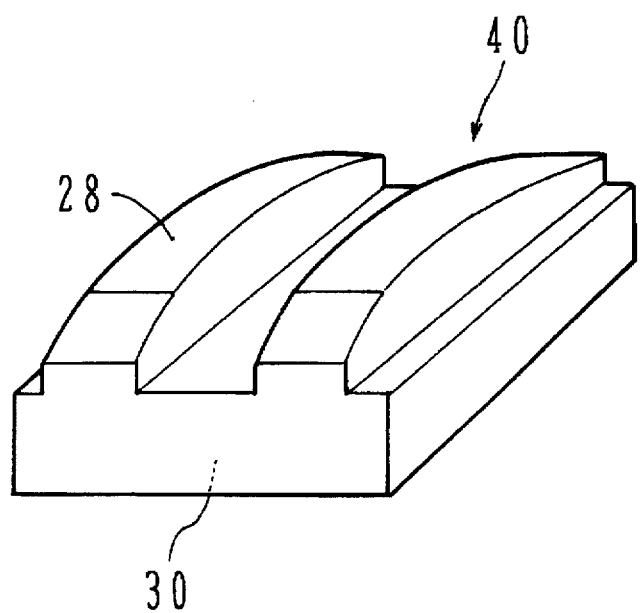

The types of lapping grains and level block are properly selected to generate desired residual stress. For example, diamonds having a diameter of 0.5 μm are used as the lapping grains, and the roughness degree Ra of the lapped back surface 30 is made as flat as about 8 angstroms. As the roughness degree becomes small while the back surface 30 is lapped with fine lapping grains, the residual compressive stress in the lapped back surface 30 reduces and the back surface is made flat. As shown in FIG. 8B, as the back surface 30 is lapped to a level 30a, the back surface 30 side shrinks whereas the slider 38 warps in the opposite direction, and the ABS 28 takes a convex (i.e., positive crown) shape. In this manner, a magnetic head 40 having a positive crown on the ABS is completed. The concavity formed by the warpage of the slider 38 is lapped and made flat.

The back surface lapping is not limited only to the process illustrated in FIG. 7B, but it may be performed by adhering the ABS 28 to the jig similar to the processing of the ABS.

The rail pattern may be formed while the row 22 is adhered to the work holder 36 as shown in FIG. 4D, and the process illustrated in FIGS. 4E and other processes are thereafter performed.

In the above embodiments of the invention, a thin film magnetic head is used. This invention is also applicable to various types of floating type magnetic heads such as a monolithic head, a composite head, and a magneto-resistance (MR)—thin film composite magnetic head.

The above methods may be applied to the formation of a curved surface of a platelet by using only abrasion (lapping).

The present invention has been described in connection with the preferred embodiments. The invention is not limited only to the above embodiments. It is apparent to those skilled in the art that various modifications, substitutions, improvement combinations and the like can be made without departing from the scope of the appended claims.

We claim:

1. A method of manufacturing a magnetic head structure having a curved surface, comprising the steps of:
   (a) preparing a platelet having a pair of first and second main surfaces;
   (b) simultaneously lapping the pair of first and second main surfaces of said platelet to a first surface roughness to provide flat platelet;
   (c) after step (b), lapping the first main surface of the lapped pair of main surfaces to a second surface roughness finer than said first surface roughness while holding said platelet such that said platelet is deformed into a convex shape; and
   (d) after step (c), lapping the second surface of the lapped pair of surfaces to a third surface roughness while holding said platelet such that said platelet is deformed to provide a positive crown on the first surface and flat surface on the second surface.

2. A method according to claim 1, wherein said second and third roughnesses are equal thereto.

3. A method according to claim 1, wherein said lapping step (c) is performed by adhering said platelet to a holder.

4. A method according to claim 3, wherein said adhesion is performed by using wax.

5. A method according to claim 1, wherein said lapping step (d) is performed by applying a pressure to said platelet without adhering said platelet.

6. A method according to claim 1, wherein said lapping steps (c) and (d) are performed by using diamond lapping grains having a same grain size.

7. A method according to claim 1, further comprising the step of forming a rail pattern by selectively removing a portion of one of the pair of main surfaces.

8. A method according to claim 7, wherein said platelet is a row having a plurality of magnetic transducers formed on one side surface, and the method further comprises the step of dividing said row into a plurality of sliders.

9. A method according to claim 1, further comprising the step of forming a taper at one edge of the first surface, between the lapping steps (c) and (d).

10. A method according to claim 1, wherein the pair of main surfaces has an elongated shape, and the second surface is formed with scribe lines in a direction crossing a longitudinal direction of said platelet.

11. A method of manufacturing a magnetic head comprising the steps of:
    (a) simultaneously lapping both an air bearing surface (ABS) and a back surface at opposite sides of a slider, whereby a residual stress accumulating layer is formed on each of said ABS back surface;
    (b) after step (a), performing one-surface lapping on said ABS to flatten said ABS while allowing said back surface to deform into a convex shape; and
    (c) after step (b), performing one-surface lapping of said back surface to make said back surface flat while allowing deformation of said ABS to form a positive crown shape.

12. A method according to claim 11, wherein said one-surface lapping step (b) is performed under a condition that the back surface is supported by a holder by using adhesive.

13. A method according to claim 12, wherein said adhesive is wax.

14. A method according to claim 12, wherein step (a) forms a residual stress accumulating layer and said one surface lapping step (b) is performed to a level deeper than said residual stress accumulating layer.

15. A method according to claim 11, wherein said slider includes thin film magnetic transducers, and said one-surface lapping step (b) of lapping said ABS while allowing warpage of said ABS functions also as a throat height lapping process for said thin film magnetic transducer.

16. A method according to claim 15, wherein said one-surface lapping steps (b) and (c) of lapping said ABS and back surface are performed so as to form generally a same residual surface stress in said ABS and back surface.

17. A method of manufacturing a magnetic head comprising the steps of:
    (a) forming a crown on an air bearing surface (ABS) of a row having a plurality of sliders each having said ABS and a back surface at opposite sides of said slider, said crown forming step (a) including both-surface lapping said ABS and said back surface, one-surface lapping said ABS flat while warping said ABS to deform said back surface into a convex shape, and one-surface lapping said back surface while warping said back surface to deform said ABS, in this order recited;
    (b) separating said row into the plurality of sliders after said step (a); and
    (c) forming a rail pattern in said ABS of each slider, at any timing between said both-surface lapping and said one-surface lapping of ABS, between said one-surface lapping of said ABS and said one-surface lapping of said back surface, or between said one-surface lapping of said back surface and said row separating step (b).

18. A method according to claim 17, wherein said slider includes thin film magnetic transducers, and said one-surface lapping step (b) of lapping said ABS while shrinking said ABS functions also as a throat height lapping process for said thin film magnetic transducer.

19. A method according to claim 17, wherein said one-surface lapping steps (b) and (c) of lapping said ABS and back surface are performed so as to form generally a same residual surface stress in said ABS and back surface.

20. A method according to claim 17, wherein said one-surface lapping of said ABS is performed such that said back surface is deformed in a convex shape along a direction crossing a longitudinal direction of said row.

21. A method of manufacturing a magnetic head comprising the steps of:

(a) performing both-surface lapping of an ABS and a back surface at opposite sides of a row having a plurality of sliders to form balanced stresses in said ABS and said back surface;

(b) forming a rail pattern in said ABS of each slider and separating said row into the plurality of sliders, after the step (a); and (c) forming a crown on said ABS after said step (b), said step (c) including one-surface lapping said ABS to make said ABS flat while shrinking said ABS to deform said back surface and then one-surface lapping said back surface to make said back surface flat while shrinking said back surface to deform said ABS to have the crown shape.

22. A method according to claim 21, wherein said slider includes thin film magnetic transducers, and said one-surface lapping step (b) of lapping said ABS while shrinking said ABS functions also as a throat height lapping process for said thin film magnetic transducer.

23. A method according to claim 21, wherein said one-surface lapping steps (b) and (c) of lapping said ABS and back surface are performed so as to form generally a same residual surface stress in said ABS and back surface.

24. A method according to claim 21, wherein said crown is a positive crown.

25. A method of manufacturing magnetic heads comprising the steps of:

(a) preparing a substrate having magnetic transducers distributed on one surface thereof in rows and columns;

(b) dividing said substrate in a row direction and forming a plurality of rows each having a plurality of magnetic transducers on one side thereof and having a pair of main surfaces;

(c) performing a both-surface lapping of a plurality of rows at the same time to lap the pair of main surfaces of each row to a first surface roughness, whereby a residual stress accumulating layer is formed on each of said main surfaces;

(d) adhering each row to an associated holder and performing a one-surface lapping of an exposed one of the pair of main surfaces of each row to a second surface roughness finer than said first surface roughness, after said step (c);

(e) performing a one-surface lapping of the other of the pair of main surfaces of each row whose one main surface was subjected to said one-surface lapping in step (d) to said second surface roughness; and (f) thereafter dividing each row to provide a plurality of sliders.

26. A method according to claim 25, wherein said adhesion of each row for said one-surface lapping of the one main surface is performed by using wax.

27. A method according to claim 25, wherein said one-surface lapping of the one and other main surfaces is performed to remove said residual stress accumulating layer.

28. A method according to claim 25, further comprising the step of forming a taper surface at one edge of the one main surface while each row is maintained adhered to the associated holder, after said one-surface lapping of the one main surface.

29. A method according to claim 25, further comprising the step of selectively patterning the one main surface to a certain depth after said taper forming step.

30. A method according to claim 25, wherein said one-surface lapping step of lapping the one main surface functions also as a throat height lapping process for said thin film magnetic transducer.

31. A method according to claim 25, wherein said one-surface lapping step of lapping the one main surface and said one-surface lapping step of lapping the other main surface are performed so as to form generally a same residual surface stress in the one and other main surfaces.

* * * * *